(12) United States Patent
Vanhelle et al.

(10) Patent No.: US 9,713,990 B2
(45) Date of Patent: Jul. 25, 2017

(54) HAPTIC FEEDBACK MODULE DESIGNED TO BE INTEGRATED INTO AN AUTOMOBILE VEHICLE FOR A MOBILE DEVICE AND CORRESPONDING CONTROL DEVICE

(75) Inventors: Stéphane Vanhelle, Marignier (FR); Jean-Marc Tissot, Viuz en Sallaz (FR)

(73) Assignee: DAV, Créteil (FR)

( * ) Notice: Subject to any disclaimer, the term of this patent is extended or adjusted under 35 U.S.C. 154(b) by 1000 days.

(21) Appl. No.: 13/576,015

(22) PCT Filed: Feb. 2, 2011

(86) PCT No.: PCT/FR2011/000066
§ 371 (c)(1),
(2), (4) Date: Nov. 8, 2012

(87) PCT Pub. No.: WO2011/095709
PCT Pub. Date: Aug. 11, 2011

(65) Prior Publication Data
US 2013/0050112 A1 Feb. 28, 2013

(30) Foreign Application Priority Data
Feb. 2, 2010 (FR) ..................... 10 00419

(51) Int. Cl.
*G08B 6/00* (2006.01)
*G06F 3/041* (2006.01)
*B60R 11/02* (2006.01)
*B60K 37/06* (2006.01)
(Continued)

(52) U.S. Cl.
CPC .............. *B60R 11/02* (2013.01); *B60K 37/06* (2013.01); *G01C 21/3652* (2013.01);
(Continued)

(58) Field of Classification Search
CPC ......... B60R 2011/094; B60R 2011/001; B60R 2011/0001–2011/0038; G06F 2200/1634; G06F 3/016; G06F 1/1632
See application file for complete search history.

(56) References Cited

U.S. PATENT DOCUMENTS

2001/0035854 A1* 11/2001 Rosenberg .............. A63F 13/06
345/156
2002/0140289 A1* 10/2002 McConnell ............. B60R 11/02
307/10.1
(Continued)

FOREIGN PATENT DOCUMENTS

DE 10 2005 021 105 A1 11/2006
DE 10 2005 053 580 A1 5/2007
(Continued)

OTHER PUBLICATIONS

International Search Report w/translation from PCT/FR2011/000066 dated Sep. 15, 2011 (6 pages).

*Primary Examiner* — Benjamin C Lee
*Assistant Examiner* — Dong Hui Liang
(74) *Attorney, Agent, or Firm* — Osha Liang LLP

(57) ABSTRACT

The invention relates to a haptic feedback module to be built into a motor vehicle for a mobile device (3) having touch-sensitive surface (3a), characterized in that said haptic feedback module comprises at least one actuator (17) configured to transmit a movement to said mobile device (3). The invention also relates to a control device for a motor vehicle which includes such a haptic feedback module.

27 Claims, 2 Drawing Sheets

Figure 1:
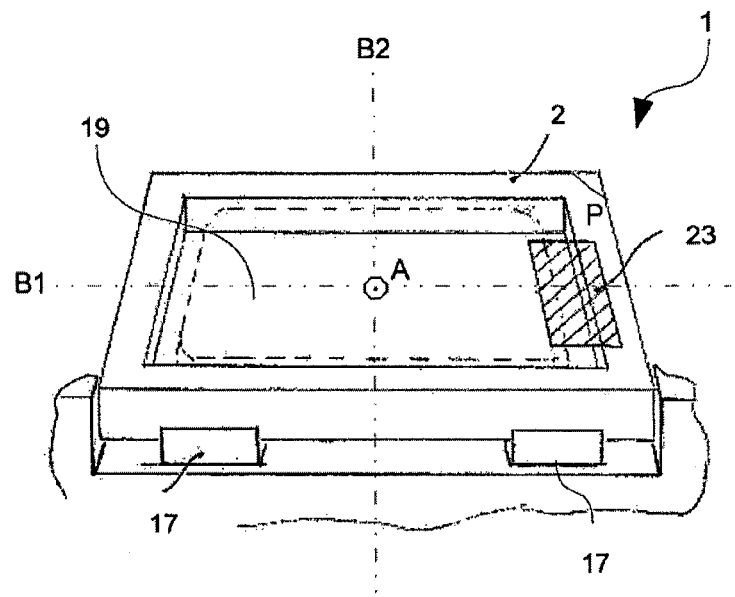

(51) Int. Cl.
  *G01C 21/36*  (2006.01)
  *G06F 1/16*  (2006.01)
  *G06F 3/01*  (2006.01)
  *B60R 11/00*  (2006.01)

(52) U.S. Cl.
  CPC .......... *G06F 1/1626* (2013.01); *G06F 1/1632* (2013.01); *G06F 3/016* (2013.01); *B60R 2011/0003* (2013.01); *B60R 2011/0085* (2013.01); *B60R 2011/0094* (2013.01); *B60R 2011/0294* (2013.01)

(56) References Cited

U.S. PATENT DOCUMENTS

| | | | | |
|---|---|---|---|---|
| 2002/0163215 A1* | 11/2002 | Emerling | ............ | B60N 2/4686 296/24.34 |
| 2002/0176571 A1 | 11/2002 | Louh | | |
| 2003/0160754 A1* | 8/2003 | Hanson | ................. | G06F 1/1613 345/156 |
| 2007/0057927 A1 | 3/2007 | Prados | | |
| 2008/0303782 A1* | 12/2008 | Grant | .................... | G06F 1/1615 345/156 |
| 2009/0051509 A1* | 2/2009 | Hwang | ................ | H04B 1/3888 340/407.2 |
| 2010/0124040 A1* | 5/2010 | Diebel | ................. | G06F 1/1628 361/816 |
| 2011/0063205 A1* | 3/2011 | Kufner | ................ | G02B 3/0006 345/156 |

FOREIGN PATENT DOCUMENTS

| | | |
|---|---|---|
| DE | 10 2006 037 156 A1 | 9/2007 |
| DE | 10 2007 015 681 A1 | 10/2008 |
| EP | 2 053 361 A1 | 4/2009 |
| WO | 02/055341 A1 | 7/2002 |

\* cited by examiner

HAPTIC FEEDBACK MODULE DESIGNED TO BE INTEGRATED INTO AN AUTOMOBILE VEHICLE FOR A MOBILE DEVICE AND CORRESPONDING CONTROL DEVICE

The present invention relates to a haptic feedback module designed to be integrated into an automobile vehicle for a mobile device. The invention also relates to a control device for an automobile vehicle comprising such a haptic feedback module.

"Mobile device" is here understood to mean a mobile device, either external to the vehicle or integrated into the vehicle but able to change places within this vehicle. As examples, the following may be mentioned: a mobile telephone, a PDA (for "Personal Digital Assistant"), or again a mobile telephone having functionalities similar to those of a computer commonly known as a "Smart phone", a satellite positioning system or GPS (for "Global Positioning System"), a communicating touch-sensitive tablet, a computer comprising a touch-sensitive shell.

These mobile devices are not necessarily equipped with a haptic feedback system allowing a haptic feedback adapted to driving to be generated such that the user remains concentrated on the road, in order for example to indicate to the user that a command has indeed been taken into account, notably during night driving or when carrying out a blind operation.

With regard to mobile devices equipped with a haptic feedback system, they must not be held in the hand while driving for safety reasons, and furthermore, the haptics generated might not be adapted to being used in automobiles because they are too weak and are hardly felt at all.

For example, from the document EP2053361, a support integrated into an automobile vehicle is known that is capable of receiving a mobile device such as a portable navigation device or else a PDA or a mobile telephone, allowing the user not to have to hold the mobile device in his hand. However, no device is provided for generating a haptic feedback adapted to use in an automobile.

From the document DE102005021105, a support integrated into an automobile vehicle capable of receiving a mobile device such as a PDA or a mobile telephone is also known. This support also allows the user not to have to hold the mobile device in his hand but no device is provided for generating a haptic feedback adapted to use in an automobile.

The objective of the invention is therefore to overcome these drawbacks of the prior art by allowing a haptic feedback adapted to automobile driving to be transmitted by means of the mobile device to the user.

For this purpose, a subject of the invention is a haptic feedback module designed to be integrated into an automobile vehicle for a mobile device with a touch-sensitive surface, characterized in that said haptic feedback module comprises a support for said mobile device and at least one actuator configured for transmitting a movement to said mobile device.

Such a haptic feedback module therefore allows a haptic feedback to be guaranteed that is sufficiently intense to be felt in a situation where the vehicle is being driven or is stopped.

Said haptic feedback module can furthermore comprise one or more of the following features, taken separately or in combination:

said at least one actuator is configured in such a manner as to transmit the movement to said mobile device by means of the support,
said at least one actuator is configured in such a manner as to be in contact with said mobile device for transmitting the movement directly to said mobile device,
said mobile device is mounted in the support on an intermediate element accommodated in the support in such a manner as to be in contact with said at least one actuator and having at least one degree of freedom with respect to the support,
said at least one actuator is configured for transmitting a movement to said mobile device when a contact is detected on the touch-sensitive surface,
said mobile device is a haptic feedback device, and said at least one actuator is configured for transmitting a movement to said mobile device when a movement generated by said mobile device is detected, in such a manner as to amplify its movement,
said haptic feedback module comprises a detachable adaptor receptacle dedicated to said mobile device placed in the support for holding said mobile device in the support,
said haptic feedback module comprises at least one means for holding said mobile device in the support,
said at least one holding means is chosen from amongst the group comprising: a means for holding by clips, a means for holding and/or elastic gripping, a means for holding by cooperation of surfaces with opposing magnetic polarity respectively carried by the support and by said mobile device, a means for holding by cooperation between at least one hole provided in the support and at least one fixing leg provided on the mobile device and a means for holding by deformation of a portion displaced by the change of state of a magneto-rheological material carried by the support,
the support has an opening for receiving said mobile device and said haptic feedback module comprises a protective cover for closing the opening of the support,
said cover is integrated into the support and is installed to be mobile between a first retracted position leaving the opening of the support free and a second deployed protection position closing the opening of the support,
said cover comprises a touch-sensitive surface,
said cover is made of a transparent material allowing a display screen of said mobile device to be viewed in the deployed position of said cover,
said cover comprises a means for image enlargement,
the touch-sensitive surface of said cover is a display touch-screen,
said at least one actuator is configured for transmitting a movement to the mobile device and to said cover by means of the mobile device when a contact is detected on the touch-sensitive surface of said cover,
the support is installed to be mobile in rotation over a fixed area of said vehicle, so as to be able to be oriented in at least two different directions,
the support is mobile in rotation about a pivoting axis substantially parallel to the plane defined by the support,
the support is mobile in rotation about an axis of rotation substantially perpendicular to the plane defined by the support,
said haptic feedback module comprises means for blocking the support on the fixed area of said vehicle according to the chosen orientation,
said haptic feedback module has an area for connection to said vehicle, the connection area is connected to a source of electrical power of said vehicle for recharging the battery of said mobile device.

The invention also relates to a control device for automobile vehicle comprising a haptic feedback module such as defined hereinabove.

Said control device can furthermore comprise one or more of the following features, taken separately or in combination:

said control device comprises a control unit for said at least one actuator of said haptic feedback module configured for transmitting to said at least one actuator a haptic feedback control signal designed according to parameters of said vehicle and/or of the user, said control device comprises an observation and analysis system for recording behavioral information on the user and for determining from this information the haptic feedback to be generated, said observation and analysis system comprises a camera for recording the movements of the eyes of the user, said control device comprises a means for transfer from the display of said mobile device to a display separate from said mobile device within said vehicle, said cover comprises a display unit separate from said mobile device.

Figure 2:
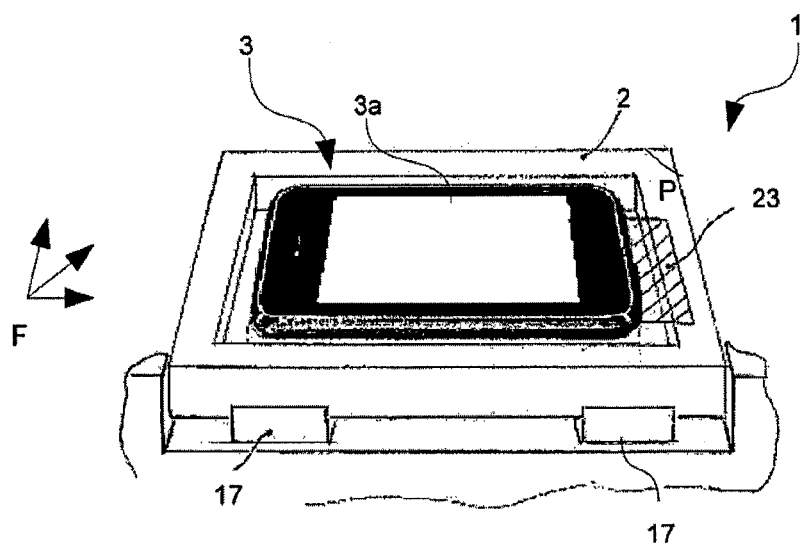
Figure 3:
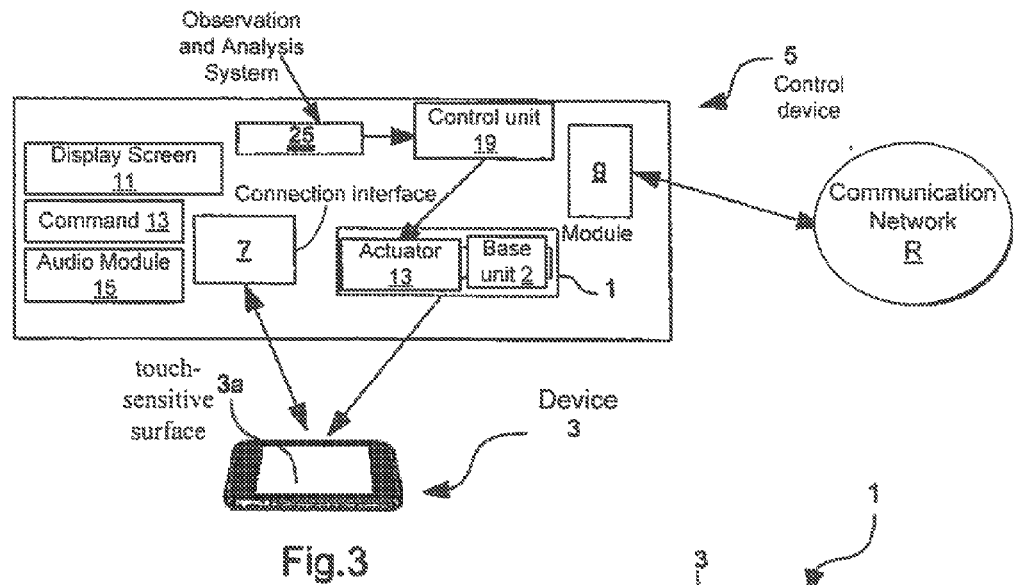
Figure 4:
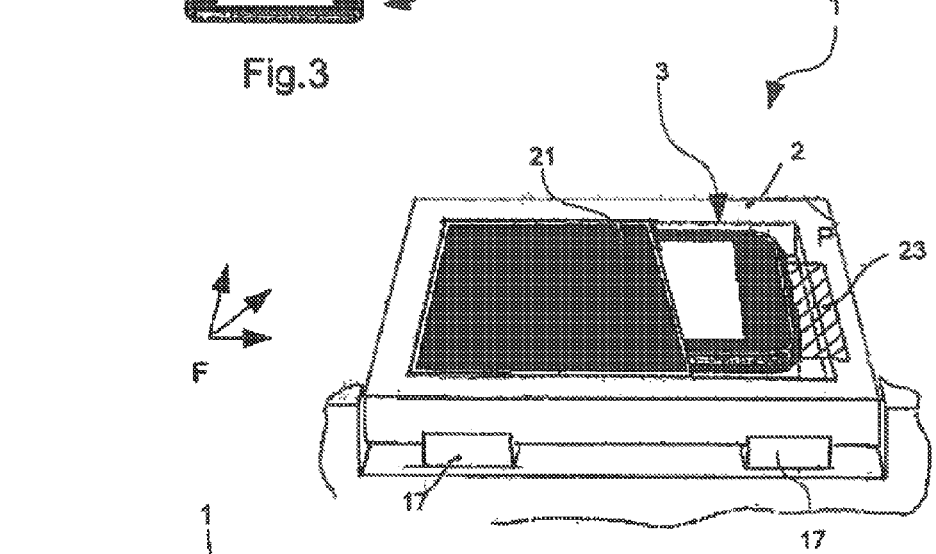
Figure 5:
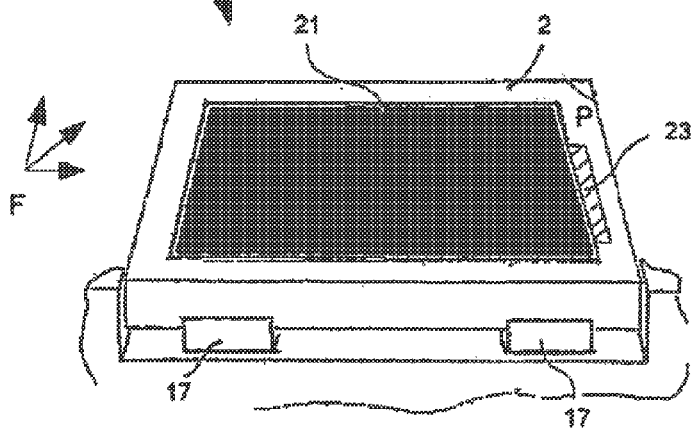

Other features and advantages of the invention will become apparent from the following description, presented by way of non-limiting example, with regard to the appended drawings in which:

FIG. 1 illustrates schematically a haptic feedback module integrated into an automobile vehicle, FIG. 2 shows the haptic feedback module in FIG. 1 receiving a mobile device, FIG. 3 shows schematically one example of a device to which the mobile device may be connected, FIG. 4 shows the haptic feedback module in FIG. 2 with a protective cover partially covering the mobile device, and FIG. 5 shows the haptic feedback module in FIG. 2 with a protective cover totally covering the mobile device.

In these figures, identical elements carry the same references.

FIG. 1 illustrates a haptic feedback module 1 comprising:

a support 2, for example in the form of a base unit 2, integrated into an automobile vehicle (not shown) for carrying or receiving a mobile device 3 as illustrated in FIG. 2, and at least one actuator 17 for transmitting a movement to the mobile device 3 so as to generate a haptic feedback.

By reason of the actuator or actuators 17, the module 1 is therefore a module with haptic feedback allowing a haptic feedback adapted to automobile driving to be generated. The module 1 is not therefore a simple support for the mobile device, such as defined for example in the documents EP2053361 and DE102005021105, which do not comprise any actuator for transmitting a movement to the mobile device not hand-held by the user, so as to generate a haptic feedback sufficiently intense to be felt in a driving situation.

For the comfort of the user, this haptic feedback module 1 is placed near to the user in any area of the vehicle accessible to the user, for example on the main console of the vehicle, the door of the user whether this be the driver or the passenger, or else on the dashboard.

"Mobile" device is understood to mean a mobile device external to the automobile vehicle or else integrated into the vehicle but movable within the vehicle. This may for example be a mobile telephone, a mobile telephone having functionalities similar to those of a computer commonly known as a Smart Phone, a PDA (for "Personal Digital Assistant"), an MP3 player in other words that is able to read audio files compressed in the MP3 format (for "MPEG Audio layer 3"), a satellite positioning system or GPS (for "Global Positioning System"), a touch-sensitive communicating tablet, or a computer having a touch-sensitive shell.

This mobile device 3 comprises a touch-sensitive control surface 3a comprising for example pressure sensors using for example FSR—for "Force Sensing Resistor"—technology, in other words using resistors sensitive to pressure, or else sensors using a capacitive or optical technology.

In the example illustrated in the figures, the mobile device 3 is a mobile telephone with a touch-sensitive surface.

FIG. 3 shows schematically one example of control device 5 integrated into an automobile vehicle to which the mobile device 3 may be connected and comprising a haptic feedback module 1.

The control device 5 comprises a connection interface 7 for example carried by the base unit 2, allowing an information or data stream communication to be established with the mobile device 3 fitted with a corresponding connection interface. This communication can notably allow the display, in the case where the mobile device 3 has a display screen (here the display screen and the touch-sensitive surface 3a are one and the same thing), to be transferred from the display screen of the mobile device 3 to a display unit of the vehicle separate from the display screen of the mobile device 3. In this case, the display of the mobile device 3 can be switched off or adapted to driving the automobile by for example displaying larger icons facilitating the navigation within a menu together with selection and validation commands.

This communication for transmitting information or data streams can use wireless technology for example of the Bluetooth® or else Wi-Fi™ type (registered trademarks).

As a variant, the connection interface 7 may comprise a SIM card reader ("Subscriber Identity Module") for the mobile devices possessing such cards.

This interface 7 also allows a mobile device 3 to be authenticated and authorized prior to exchanging data or information streams between the control device 5 and the mobile device 3.

The control device 5 may furthermore comprise a module 9 for connection to a communications network R.

The control device 5 can additionally comprise a display screen 11, one or more means for inputting a command 13 such as a thumbwheel, a joystick, a keyboard, a touch-sensitive surface, and an audio module 15 comprising a microphone and/or one or more loudspeakers.

By way of example, when the mobile device 3 comprises a directory of telephone numbers, such a control device 5 allows the list of numbers to be displayed on the screen 11, a number to be called to be selected using the means 13, a connection to be established with the telecommunications network R, the user to talk over the microphone and to receive the communication via the loudspeakers of the module 15.

As an alternative, this control device 5 can allow a list of audio/video files stored in the mobile device 3 to be displayed on the screen 11, a file to be read to be selected and the file selected to be heard via the loudspeakers and potentially seen on the screen 11 or a larger additional screen.

Furthermore, this control device 5 can comprise a control unit 19 for the haptic feedback module, more precisely for the actuators 17.

This control device 5 may also comprise an observation and analysis system 25 allowing the haptic feedback generated according to the behavior of the user, more precisely of the driver, to be adapted as will be described in the following part.

With reference to FIGS. 1 to 3, it can be observed that the base unit 2 carries the actuators 17 designed to transmit a haptic feedback adapted to automobile use to the user through the mobile device 3, in order to for example assure the user that a command input onto the touch-sensitive surface 3a of the mobile device 3 has been taken into account.

The control unit 19 connected to the actuator 17 is for example used to supply a control signal to the actuator 17 so that the latter transmits a movement to the mobile device 3, so as to generate the haptic feedback adapted to automobile use. The control signal is for example sinusoidal or comprises a pulse or a succession of pulses simultaneously or alternately in one or more directions of space.

The control signal can be made to vary as a function of parameters of the vehicle in order to adapt the haptic feedback. More precisely, by way of example, the haptic feedback may be intensified, for example by transmitting a more rapid or higher amplitude movement to the mobile device 3, when the vehicle is in the process of accelerating or else when the speed of the vehicle reaches a predetermined threshold. For this purpose, the control unit 19 receives this information from sensors of the vehicle and adapts the control signal as a consequence.

Furthermore, the attitude of the user can be analyzed in order to adapt the haptic feedback, More precisely, a system for observation 25 of the user can communicate information for example to the control unit 19 which adapts the control signal as a consequence.

By way of example, the system for observation 25 for example provided in the control device 5 can comprise a camera for following the movements of the eyes of the user, and an analysis unit which, based on these movements, determines whether the user is particularly concentrated on the road and whether he needs, for example, a more intense haptic feedback. For example, if many angular shifts of the eyes are detected, the control signal is designed to generate an intensified haptic feedback by for example transmitting, to the mobile device 3, a more rapid or a higher amplitude movement.

In the example illustrated, the base unit 2 has an opening 19 bounded by the dashed line for receiving the mobile device 3.

The mobile device 3 can be held in this opening 19 by various holding means. By way of example, the mobile device 3 can be held with clips. As an alternative, the base unit 2 can have an elastic portion for holding and/or gripping the mobile device 3. According to another variant, the base unit 2 and the mobile device 3 both have surfaces of opposing magnetic polarity. According to yet another variant, the base unit 2 can have a portion made of magneto-rheological material which is deformed near to a magnet carried by the mobile device 3. The mobile device may additionally have one or more fixing legs which can be respectively engaged in corresponding complementary holes on the base unit 2.

With reference to FIGS. 4 and 5, a protective cover 21 can be disposed on the base unit 2 in order to protect the mobile device 3.

This cover 21 can be integrated into the base unit 2 and be mobile between a first retracted position leaving the opening 19 of the base unit 2 free (FIGS. 1 and 2) in such a manner as to be able to place the mobile device 3 and a second deployed protection position closing the opening 19 of the base unit 2 (FIG. 5) so as to protect the mobile device 3.

This cover 21 may also be dissociated from the base unit 2 and be fixed in a detachable manner on the base unit 2 once the mobile device 3 has been received in the opening 19.

Aside from its protection function, the cover 21 can also act as a touch-sensitive surface or alternatively a display touch-screen. The cover 21 is therefore also connected to the mobile device by means of the haptic feedback module 1, for example by a Bluetooth® or Wi-Fi™ wireless technology as previously indicated.

The cover 21 therefore comprises detection sensors for example using "FSR" or else capacitive technology. "FSR" technology is favored, being better adapted to automobile driving.

According to the first variant in which the cover 21 is a touch-sensitive surface, it can be made of a transparent material, in particular for allowing the user to see the display on the display screen of the mobile device 3 protected by the cover 21. In order to improve the comfort of use when driving an automobile, the cover 21 may also comprise a means for image enlargement, such as a lens, a deformable glass, or any other equivalent element, allowing the user to see the display of the mobile device 3 with a predetermined magnification.

In the opposite case where the display of the mobile device 3 is transferred onto a separate display unit of the vehicle, the material of the cover 21 is unimportant whether transparent or opaque.

According to the second variant in which the cover 21 is a display touch-screen, it may be envisioned for the display of the mobile device 3 to be transferred onto the cover 21. For this purpose, a liquid crystal screen is for example used according to the technology TFT (for "thin film transistor").

In all these cases, the movement generated by the actuators 17 must therefore be amplified so as to guarantee a sufficiently intense haptic feedback on the cover 21, transmitted by means of the base unit 2 and/or the mobile device 3.

According to an alternative not shown, the base unit 2 comprises an adaptor receptacle (not shown) fixed in a detachable manner in the opening 19 and dedicated to the mobile device 3 in question and potentially also to other particular mobile devices. This fixing can be effected using the aforementioned holding means. Furthermore, the mobile device 3 can also be held in the receptacle (not shown) by one of the holding means mentioned hereinabove. The receptacle (not shown) therefore also participates in the holding of the mobile device 3 in the base unit 2.

Various adaptor receptacles may be provided that are respectively dedicated to one or more particular mobile devices. The base unit 2 can therefore thus be designed according to the mobile device 3 in question.

According to yet another alternative not shown, the mobile device 3 may be fixed in a detachable manner directly onto the base unit 2 without being received in an opening 19 of the base unit 2 such as described hereinabove.

Furthermore, the base unit 2 may be orientable in at least two different directions, for example a first orientation of the "portrait" type and a second orientation of the "landscape" type, in order to adapt the base unit 2 according to the preferences of the user or else according to the required application or again so as to be adapted to the orientation of the display of the mobile device 3. As an example, the possibility of a larger display in landscape mode with respect to portrait mode may be mentioned, for example of icons or of a virtual keyboard, on the touch-sensitive surface 3a of the mobile device 3 allowing a navigation and the use of control limb movements that are more comfortable while driving.

For this purpose, the base unit 2 is installed to be mobile in rotation about an axis of rotation A substantially perpendicular to the plane P defined by the base unit 2 (FIG. 1), over a fixed area of the vehicle.

As a complement or as a variant, the base unit 2 may be inclined in such a manner as to improve the visibility of the user, or else in order to avoid seeing reflections on the touch-sensitive surface 3a of the mobile device 3.

For this purpose, the base unit 2 is installed to be mobile in rotation about a pivoting axis B1 or B2 substantially parallel to the plane P defined by the base unit 2, over a fixed area of the vehicle.

In the example illustrated in FIG. 1, the base unit 2 has substantially the form of a parallelepiped and the first pivoting axis B1 is substantially parallel to the longitudinal side of the base unit 2. The second pivoting axis B2 is substantially parallel to the lateral side of the base unit 2.

Means are then provided for blocking the base unit 2 on the fixed area of the vehicle in the various possible directions of orientation.

Of course, the fixed area of the vehicle, on which the base unit 2 is mounted according to the one of the possible orientations, must be an area accessible to the user. As previously indicated, this area can be on the central console, on the door near to the user or else on the dashboard.

Furthermore, the base unit 2 can have a connection area 23 connected to a source of electrical power of the vehicle and by means of which the battery of the mobile device 3 can be recharged. For this purpose, the mobile device 3 comprises a complementary connection area. The mobile device 3 can therefore be recharged in a simple fashion by means of the base unit 2 without requiring any additional bulky connection components.

In addition, in the case where the base unit 2 comprises an adaptor receptacle, this receptacle has a connection area 23 designed to correspond to the connection area of one or more particular mobile devices 3.

The base unit 2 is therefore upgradable so as to be adapted to various mobile devices that may be envisioned.

As far as the actuators 17 are concerned, one or more actuators 17 are provided depending on the force required to generate a haptic feedback adapted to automobile use. These actuators 17 can be of the "voice-coil" type, using an electromagnet, or else piezoelectric. Since these various types of actuators are known to those skilled in the art, they will not be described in more detail here.

Furthermore, the actuators 17 can be configured for transmitting a translation movement in the plane defined by the mobile device 3 and/or perpendicular to the plane defined by the mobile device 3, as illustrated by the arrows F in FIGS. 2, 4 and 5. As a variant or as a complement, the actuators 17 can transmit a rotational movement.

In the example illustrated, the actuators 17 are configured in such a manner as to transmit the movement to the mobile device 3 via the base unit 2.

As a variant (not shown), the actuators 17 can be configured to be in mechanical contact with the mobile device 3, in such a manner as to transmit the movement directly to the mobile device 3 without going via the base unit 2.

According to yet another variant (not shown), the haptic feedback module 1 can comprise an intermediate element accommodated in the base unit 2 with an additional degree of freedom with respect to the base unit 2 and in direct contact with, on the one hand, the mobile device 3 and, on the other, the actuators 17, in such a manner that the movement of the actuators 17 is transmitted to the mobile device 3 via this intermediate element and not the base unit 2. In this case, the base unit 2 can be fixed during the generation of the haptic feedback.

According to a first embodiment the actuators 17 are configured for transmitting a movement to the mobile device 3 when a contact is detected on the touch-sensitive surface 3a of the mobile device 3.

More precisely, when a contact is detected on the touch-sensitive surface 3a of the mobile device 3, for example by sensors with a touch-sensitive surface (not shown) of the mobile device 3 such as pressure sensors using for example FSR (for "Force Sensing Resistor") technology, in other words using resistors sensitive to pressure, or alternatively sensors using a capacitive or optical technology, the mobile device 3 transmits a contact detection signal to the haptic feedback module 1 for example to the control unit 19 for the actuators 17 using for example Bluetooth® or else Wi-Fi™ technology by means of the connection interface 7.

Upon reception of this contact detection signal, this control unit 19 (see FIG. 3) can transmit a control signal to the actuators 17 which start to move. The movement of the actuators 17 is then transmitted mechanically to the base unit 2 then to the mobile device 3 via the base unit 2 or, as a variant, directly to the mobile device 3, or else via an intermediate element, as previously indicated.

The touch-sensitive surface 3a of the mobile device 3 may also have various active touch-sensitive areas, for example respectively associated with a predefined command, such that when a contact is detected on one of these touch-sensitive areas, there is a transmission of a contact detection signal allowing the generation of a haptic feedback such as described hereinabove to be triggered. In contrast, when a contact is applied on the touch-sensitive surface 3a between two areas, this can result in no detection signal being transmitted and hence no haptic feedback being generated.

Furthermore, when the touch-sensitive surface 3a comprises FSR sensors, the transmission of a contact detection signal for triggering the generation of a haptic feedback can be a function of the level of pressure of the contact applied on the touch-sensitive surface 3a.

More precisely, a contact exerted on the touch-sensitive surface 3a with a level of pressure below a predefined pressure threshold can be associated with a command for selection within a menu and consequently does not require the generation of a haptic feedback. In this case, no control signal is transmitted to the actuators 17.

On the other hand, when the level of pressure of a contact exerted on the touch-sensitive surface 3a reaches the predefined level of pressure, this contact is associated with a validation command which requires a haptic feedback. In this case, the mobile device 3 transmits a contact detection signal and the actuators 17 receive a control signal for generating a haptic feedback.

A second embodiment differs from the first embodiment by the fact that the touch-sensitive surface on which the contacts are exerted is provided on the cover 21 (FIG. 5) and no longer on the mobile device 3. Of course, the touch-sensitive surface of the cover 21 can exhibit the same characteristics as the touch-sensitive surface 3a of the mobile device 3.

In this case, when a contact is detected on the touch-sensitive surface of the cover 21, the latter transmits a contact detection signal to the haptic feedback module 1 for example to the control unit 19 (FIG. 3) which transmits a control signal to the actuators 17 for generating a haptic feedback. In this case, the control signal is adapted such that the haptic feedback generated according to this second embodiment is more intense than the haptic feedback generated according to the first embodiment.

Indeed, the actuators 17 transmit a movement to the base unit 2 and/or to the mobile device 3, which in turn transmits it to the cover 21.

According to a third embodiment (FIGS. 2 and 3), the mobile device 3 is a haptic feedback device, and the actuators 17 are configured for transmitting a movement to the mobile device 3 when a movement generated by the mobile device 3 is detected, in such a manner as to amplify the haptic feedback.

In this case, the base unit 2 comprises one or more motion sensors (not shown), such as an accelerometer, configured so as to be mechanically connected to the mobile device 3 when it is received in the base unit 2 or fixed onto the base unit 2. Of course, optical motion sensors may be provided, or else any other sensor allowing it to be identified that the mobile device 3 is in motion.

When the mobile device 3 generates a haptic feedback in order to indicate to the user that his command has been taken into account, the motion sensors detect the movement of the mobile device 3 and transmit a movement detection signal for example to the control unit 19 for the actuators 17. When this movement detection signal is received, this control unit 19 can transmit a control signal to the actuators 17 which start to move. The movement of the actuators 17 is then transmitted mechanically to the base unit 2 then to the mobile device 3 via the base unit 2 or, as a variant, directly to the mobile device 3 or else via an intermediate element, as previously indicated.

Thus, with such a base unit 2, the ergonomic comfort of the mobile device 3 is enhanced in the automobile context by generating in a simple fashion a touch-sensitive feedback felt without difficulty by the user.

The invention claimed is:

1. A haptic feedback module for a mobile device with a touch-sensitive surface, configured to be integrated into an automobile vehicle, comprising:
   a frame configured to be installed on a surface of the automobile vehicle;
   a support configured to removably hold the mobile device; and
   at least one actuator to provide moving action responsive to at least one signal from the mobile device,
   wherein the frame and the support are mechanically separate elements, enabling the support to be suspended on the frame by the at least one actuator and move relative to the frame, and
   wherein the at least one actuator is installed on the frame and configured to engage with the support to transmit the movement of the support imparted by the moving action of the at least one actuator to provide haptic feedback of user input to the touch-sensitive surface of the mobile device.

2. The haptic feedback module as claimed in claim 1, wherein said mobile device is mounted in the support on an intermediate element accommodated within the support to be in contact with said at least one actuator, and wherein the mobile device has at least one degree of freedom with respect to the support.

3. The haptic feedback module as claimed in claim 1, wherein said at least one actuator is configured for transmitting a movement to said mobile device when a contact is detected on the touch-sensitive surface.

4. The haptic feedback module as claimed in claim 1, said mobile device being a haptic feedback device, wherein said at least one actuator is configured for transmitting a movement to said mobile device when a movement generated by said mobile device is detected, in such a manner as to amplify the movement.

5. The haptic feedback module as claimed in claim 1, wherein said haptic feedback module comprises a detachable adaptor receptacle dedicated to said mobile device placed in the support for holding said mobile device within the support.

6. The haptic feedback module as claimed in claim 5, wherein said haptic feedback module comprises at least one means for holding said mobile device within the support.

7. The haptic feedback module as claimed in claim 6, wherein said at least one holding means is selected from the group consisting of:
   a means for holding by clips,
   a means for elastic holding and/or gripping,
   a means for holding by cooperation of surfaces with opposing magnetic polarity respectively carried by said haptic feedback module and by said mobile device,
   a means for holding by cooperation between at least one hole provided in said haptic feedback module and at least one fixing leg provided on said mobile device, and
   a means for holding by deformation of a portion displaced by the change of state of a magneto-rheological material carried by said haptic feedback module.

8. The haptic feedback module as claimed in claim 6, wherein the holding means comprises the adaptor receptacle.

9. The haptic feedback module as claimed in claim 1, wherein the support has an opening for receiving said mobile device, and wherein said haptic feedback module comprises a protective cover closing the opening of the support.

10. The haptic feedback module as claimed in claim 9, wherein said cover is integrated into the support and is installed to be mobile between a first retracted position leaving the opening of the support free and a second deployed protection position closing the opening of the support.

11. The haptic feedback module as claimed in claim 9, wherein said cover comprises a touch-sensitive surface.

12. The haptic feedback module as claimed in claim 11, wherein said cover is made of a transparent material allowing a display screen of said mobile device to be viewed in the deployed position of said cover.

13. The haptic feedback module as claimed in claim 12, wherein said cover comprises a means for image enlargement.

14. The haptic feedback module as claimed in claim 11, wherein the touch-sensitive surface of said cover is a display touch-screen.

15. The haptic feedback module as claimed in claim 11, wherein said at least one actuator is configured for transmitting a movement to the mobile device and to said cover by the mobile device when a contact is detected on the touch-sensitive surface of said cover.

16. The haptic feedback module as claimed in claim 1, wherein the support is installed to be mobile in rotation over a fixed area of said vehicle, so as to be able to be oriented in at least two different directions.

17. The haptic feedback module as claimed in claim 16, wherein the support is mobile in rotation about a pivoting axis parallel to a plane (P) defined by the support.

18. The haptic feedback module as claimed in claim 16, wherein the support is mobile in rotation about an axis of rotation (A) perpendicular to a plane (P) defined by the support.

19. The haptic feedback module as claimed in claim 16, further comprising means for blocking the support on the fixed area of said vehicle in the chosen orientation.

20. The haptic feedback module as claimed in claim 1, wherein said haptic feedback module has an area for connection to said vehicle.

21. The haptic feedback module as claimed in claim 20, wherein the area for connection is connected to a source of electrical power of said vehicle for recharging a battery of said mobile device.

22. A control device for an automobile vehicle comprising a haptic feedback module as claimed in claim 1.

23. The control device as claimed in claim 22, comprising:

a control unit for said at least one actuator of said haptic feedback module configured for transmitting to said at least one actuator a haptic feedback control signal adapted according to parameters of said vehicle and/or of the user.

24. The control device as claimed in claim 23, further comprising an observation and analysis system for recording behavioral information on the user and for determining from this information the haptic feedback to be generated.

25. The control device as claimed in claim 24, wherein said observation and analysis system comprises a camera for recording the movements of the eyes of the user.

26. The control device as claimed in claim 22, wherein a means for transfer from the display of said mobile device to a display separate from said mobile device in said vehicle.

27. The control device as claimed in claim 26, wherein a cover comprises a display unit separate from said mobile device.

* * * * *